US008810858B2

(12) United States Patent
Kuno

(10) Patent No.: US 8,810,858 B2
(45) Date of Patent: Aug. 19, 2014

(54) PRINT CONTROL DEVICE EXECUTING ERROR DIFFUSION PROCESS IN WHICH CONDITION IS DETERMINED BY PROBABILITY

(71) Applicant: Brother Kogyo Kabushiki Kaisha, Nagoya (JP)

(72) Inventor: Masashi Kuno, Obu (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 13/830,213

(22) Filed: Mar. 14, 2013

(65) Prior Publication Data

US 2013/0335781 A1   Dec. 19, 2013

(30) Foreign Application Priority Data

Jun. 13, 2012   (JP) ................. 2012-133486

(51) Int. Cl.
*H04N 1/40* (2006.01)
(52) U.S. Cl.
USPC ................ 358/3.03; 358/3.04; 358/3.05
(58) Field of Classification Search
None
See application file for complete search history.

(56) References Cited

U.S. PATENT DOCUMENTS

| 5,825,940 | A | 10/1998 | Yamagata et al. |
| 6,031,627 | A | 2/2000 | Kakutani |
| 6,089,691 | A | 7/2000 | Kakutani |
| 6,099,105 | A | 8/2000 | Kakutani |
| 6,563,604 | B1 * | 5/2003 | Morimatsu et al. .......... 358/3.09 |
| 6,602,003 | B2 * | 8/2003 | Kakutani .................... 400/76 |
| 6,943,918 | B1 | 9/2005 | Kakutani |
| 7,034,964 | B2 | 4/2006 | Suzuki |
| 7,298,525 | B2 * | 11/2007 | Hagai et al. ................. 358/1.9 |
| 7,446,903 | B2 * | 11/2008 | Hagai et al. ................ 358/3.03 |
| 7,463,387 | B2 * | 12/2008 | Hagai et al. ................ 358/3.03 |
| 7,554,697 | B2 * | 6/2009 | Mizutani et al. ............ 358/3.12 |
| 7,929,183 | B2 | 4/2011 | Kakutani |
| 8,416,457 | B2 * | 4/2013 | Kakutani .................... 358/3.03 |
| 8,643,904 | B2 | 2/2014 | Kuno |

(Continued)

FOREIGN PATENT DOCUMENTS

| JP | H08-204960 A | 8/1996 |
| JP | H10-157167 A | 6/1998 |
| JP | 2000-006444 A | 1/2000 |
| WO | 98/03341 A1 | 1/1998 |

OTHER PUBLICATIONS

Notice of Allowance issued in related U.S. Appl. No. 13/830,329, dated Apr. 8, 2014.

*Primary Examiner* — Dung Tran
(74) *Attorney, Agent, or Firm* — Merchant & Gould PC

(57) ABSTRACT

In a print control device, an executing unit executes an error diffusion process in which one of a first and second setting processes is executed. In the first setting process, the executing unit determines whether a first condition is satisfied. The first condition includes that the corrected value of the pixel data is larger than the first threshold value and that the first allowance condition determined by a first probability is satisfied. After the executing unit determines that the first condition is not satisfied, the executing unit determines whether a second condition is satisfied. The second condition includes that the corrected value of the pixel data is larger than the second threshold value. In the second setting process, the executing unit determines whether the second condition is satisfied. After the executing unit determines that the second condition is not satisfied, the executing unit determines whether the first condition is satisfied.

10 Claims, 9 Drawing Sheets

(56) References Cited

U.S. PATENT DOCUMENTS

| | | | |
|---|---|---|---|
| 2003/0053098 A1* | 3/2003 | Hagai et al. | 358/1.9 |
| 2003/0169455 A1* | 9/2003 | Takahashi et al. | 358/3.03 |
| 2008/0259361 A1* | 10/2008 | Kakutani | 358/1.8 |
| 2011/0033124 A1 | 2/2011 | Kuno | |
| 2012/0188609 A1* | 7/2012 | Kuno | 358/3.02 |
| 2013/0027753 A1 | 1/2013 | Yoshida | |
| 2013/0335782 A1 | 12/2013 | Kuno | |

* cited by examiner

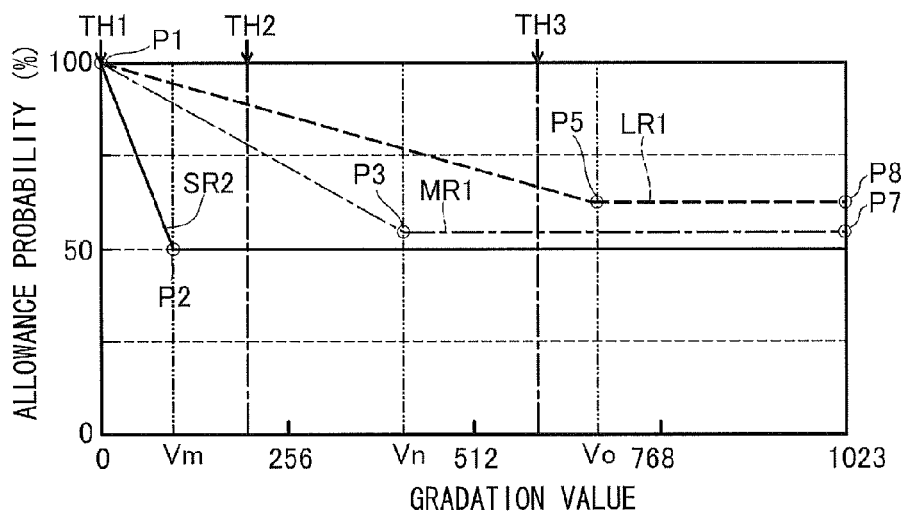
FIG. 7(A) FIRST VARIATION
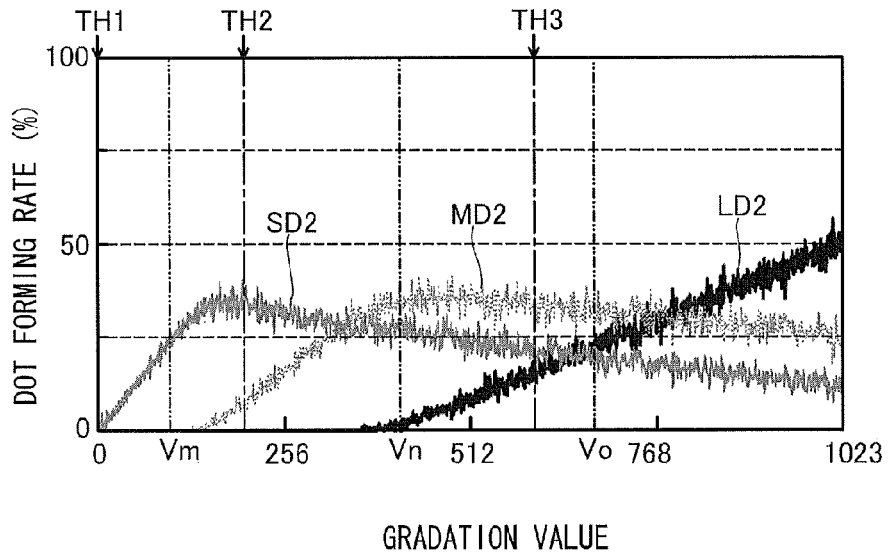
FIG. 7(B) FIRST VARIATION

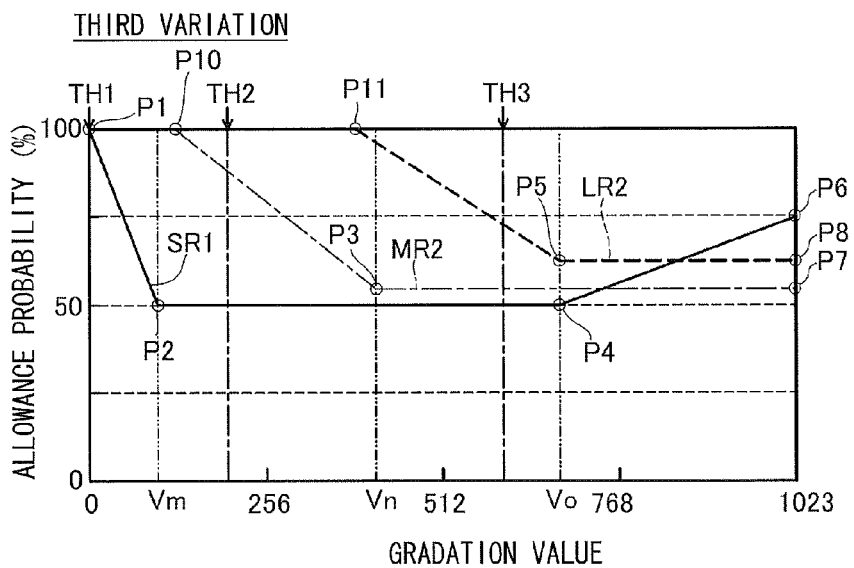

PRINT CONTROL DEVICE EXECUTING ERROR DIFFUSION PROCESS IN WHICH CONDITION IS DETERMINED BY PROBABILITY

CROSS REFERENCE TO RELATED APPLICATION

This application claims priority from Japanese Patent Application No. 2012-133486 filed Jun. 13, 2012. The entire content of the priority application is incorporated herein by reference.

TECHNICAL FIELD

The present invention relates to the image processing of images to be printed, and particularly to a halftone process using error matrices.

BACKGROUND

An inkjet printing device known in the art prints images by ejecting ink droplets from a print head onto paper to form dots (print pixels). Printing is performed using a plurality of dot types, such as dark and light dots, or large and small dots. To execute this type of printing, a technique for optimizing the proportions of dot types to improve image quality is required. For example, dot recording rates set for each dot type based on input gradation values may be compared to threshold values to generate dot data representing which dot is to be formed.

SUMMARY

Therefore, it is an object of the present invention to provide a technology different from the conventional technology described above that is capable of improving the quality of printed images produced using a plurality of dot types.

In order to attain the above and other objects, the invention provides a print control device. The print control device includes a processor; and a memory that stores a computer program that, when executed by the processor, causes the control device to function as: an acquiring unit, an executing unit, and an output unit. The acquiring unit is configured to acquire image data representing an image including a plurality of pixels. The image data includes a plurality of pixel data corresponding to the plurality of pixels. Each of the plurality of pixel data includes a gradation value. The executing unit is configured to execute an error diffusion process on each of the plurality of pixel data. The executing unit includes a target pixel setting unit, a correcting unit, a first determining unit, a second determining unit, a dot value setting unit, and an error value setting unit. The target pixel setting unit is configured to set target pixel data from among the plurality of pixel data. The correcting unit is configured to correct a gradation value of the target pixel data by using a distribution error. The distribution error is set by at least one error value of at least one pixel data on which the error diffusion process has been executed. The first determining unit is configured to determine whether a corrected value of the target pixel data is larger than a first threshold value, and determine whether the corrected value of the target pixel data is larger than a second threshold value different from the first threshold value. The second determining unit is configured to determine whether a first allowance condition is satisfied. The first allowance condition is determined by a first probability. The first probability depends on the gradation value of the target pixel data. The dot value setting unit is configured to set a dot value of the target pixel data to one of a first dot value and a second dot value different from the first dot value. The dot value indicates a size of a dot. The error value setting unit is configured to set an error value of the target pixel data based on both concentration value corresponding to the dot value of the target pixel data and the corrected value of the target pixel data. The output unit is configured to output print data determined by the dot value for each of the plurality of pixel data. The executing unit executes one of a first setting process and a second setting process. In the first setting process, the executing unit determines whether a first condition is satisfied. The first condition includes that the corrected value of the target pixel data is larger than the first threshold value and that the first allowance condition is satisfied. In the first setting process, after the executing unit determines that the first condition is satisfied, the dot value setting unit sets the dot value of the target pixel data to the first dot value. In the first setting process, after the executing unit determines that the first condition is not satisfied, the executing unit determines whether a second condition is satisfied. The second condition includes that the corrected value of the target pixel data is larger than the second threshold value. In the second setting process, the executing unit determines whether the second condition is satisfied. In the second setting process, after the executing unit determines that the second condition is satisfied, the dot value setting unit sets the dot value of the target pixel data to the second dot value. In the second setting process, after the executing unit determines that the second condition is not satisfied, the executing unit determines whether the first condition is satisfied.

According to another aspect, the present invention provides a non-transitory computer-readable storage medium storing computer-readable instructions that, when executed by a processor, causes an image processing device to perform: acquiring image data representing an image including a plurality of pixels, the image data including a plurality of pixel data corresponding to the plurality of pixels, each of the plurality of pixel data including a gradation value; executing an error diffusion process on each of the plurality of pixel data, the executing including: setting target pixel data from among the plurality of pixel data; correcting a gradation value of the target pixel data by using a distribution error, the distribution error being set by at least one error value of at least one pixel data on which the error diffusion process has been executed; determining whether a corrected value of the target pixel data is larger than a first threshold value; determining whether the corrected value of the target pixel data is larger than a second threshold value different from the first threshold value; determining whether a first allowance condition is satisfied, the first allowance condition being determined by a first probability, the first probability depending on the gradation value of the target pixel data; setting a dot value of the target pixel data to one of a first dot value and a second dot value different from the first dot value, the dot value indicating a size of a dot; and setting an error value of the target pixel data based on both concentration value corresponding to the dot value of the target pixel data and the corrected value of the target pixel data; and outputting print data determined by the dot value for each of the plurality of pixel data. The executing executes one of a first setting process and a second setting process. In the first setting process, the executing determines whether a first condition is satisfied. The first condition includes that the corrected value of the target pixel data is larger than the first threshold value and that the first allowance condition is satisfied. In the first setting process, after the executing determines that the first condition is satisfied, the setting of the dot value sets the dot value of the target pixel data to the first dot value. In the first setting process, after the executing determines that the first condition is not satisfied, the executing determines whether a second condition is satisfied. The second condition includes that the corrected value of the target pixel data is larger than the second threshold value. In the second setting process, the executing determines whether the second condition is satisfied. In the second setting process, after the executing determines that the second condition is satisfied, the setting of the dot value sets the dot value of the target pixel data to the second dot value. In the second setting process, after the executing determines that the second condition is not satisfied, the executing determines whether the first condition is satisfied.

BRIEF DESCRIPTION OF THE DRAWINGS

The particular features and advantages of the invention as well as other objects will become apparent from the following description taken in connection with the accompanying drawings, in which:

FIG. 7(A) is a graph showing a relationship between gradation values and allowance probabilities according to a first modification;

FIG. 7(B) is a graph showing a relationship between gradation values and dot-forming rates according to the first modification;

FIG. 9 is a graph showing a relationship between gradation values and allowance probabilities according to a third modification.

DETAILED DESCRIPTION

Figure 1:
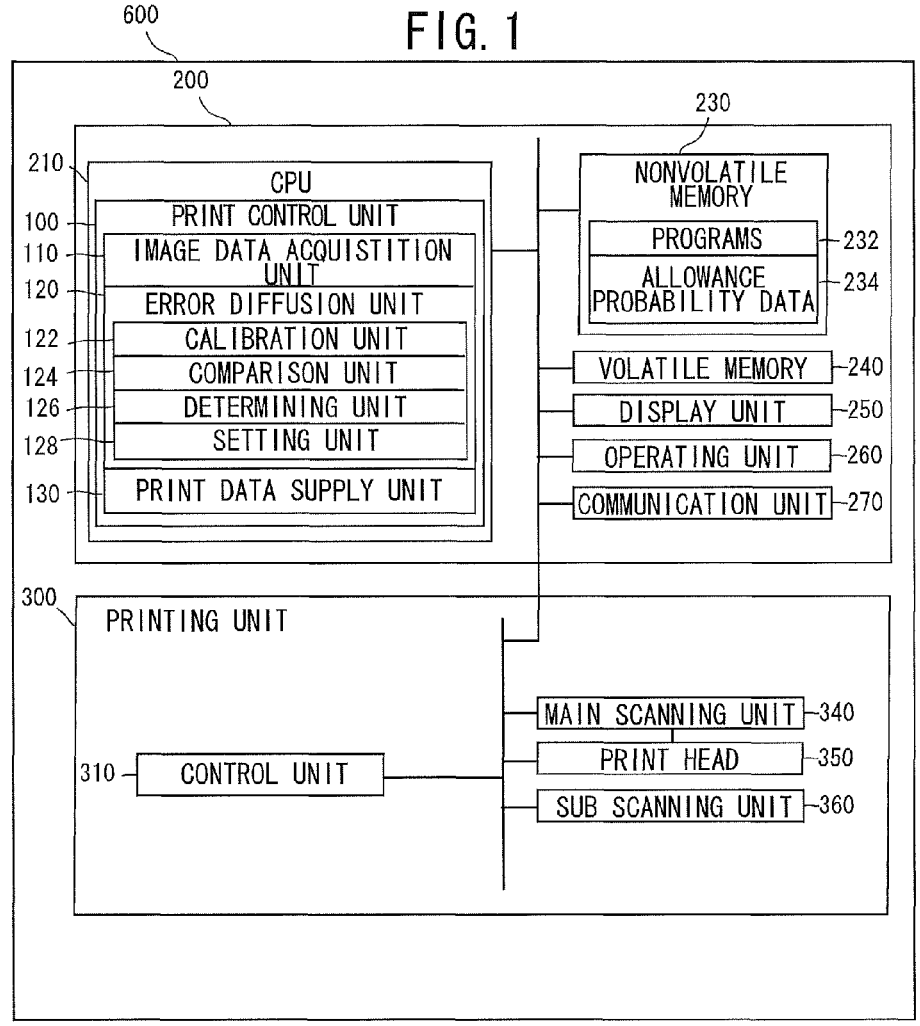
FIG. 1 is a block diagram of a printer according to an embodiment.

A. First Embodiment
A-1: Structure of a Printer
FIG. 1 is a block diagram of a printer 600. The printer 600 includes a control unit 200, and a printing unit 300.

The control unit 200 is a computer for controlling operations of the printer 600. The control unit 200 includes a CPU 210; a nonvolatile memory 230, such as EEPROM; a volatile memory 240, such as DRAM, providing a buffer region (an error buffer EB described later with reference to FIG. 3, for example) in which the CPU 210 stores process data; a display unit 250, such as a liquid crystal display; an operating unit 260, such as a touchscreen; and a communication unit 270 constituting an interface for communicating with external devices.

The nonvolatile memory 230 stores programs 232, and allowance probability data 234. The CPU 210 executes the programs 232 to implement various functions, including the functions of a print control unit 100. The print control unit 100 controls the printing unit 300 to execute printing operations using image data representing the image to be printed (hereinafter referred to as "target image data"). The target image data is supplied to the printer 600 from an external device, such as a personal computer or other computing device, a USB memory or other storage device, and the like. The allowance probability data 234 is data referenced during an error diffusion process described later. The allowance probability data 234 may also be integrated in the programs 232.

In the embodiment, the print control unit 100 includes an image data acquisition unit 110 for acquiring target image data; an error diffusion unit 120 for executing an error diffusion process as a halftone process; and a print data supply unit 130 for supplying print data including dot data generated in the error diffusion process to the printing unit 300. The error diffusion unit 120 further includes a calibration unit 122 for calibrating gradation values of a target pixel based on distribution error; a comparison unit 124 for comparing the calibrated gradation values to prescribed thresholds; a determination unit 126 for determining whether a dot allowance condition has been satisfied based on the probability associated with the gradation values; and a setting unit 128 for setting dot values for target pixels based on dot forming conditions. The processes executed by these functional units will be described later.

The printing unit 300 includes a control circuit 310, a print head 350, a main scanning unit 340, and a sub scanning unit 360.

The sub scanning unit 360 includes a conveying motor, and various conveying rollers (not shown). The sub scanning unit 360 executes a sub scan for conveying a printing medium (a sheet of paper of A3 or A4 size, for example) in a sub scanning direction under the control of the control circuit 310.

The main scanning unit 340 includes a main scanning motor, and a support shaft (not shown) that slidably supports the print head 350 so that the print head 350 can move in a main scanning direction orthogonal to the sub scanning direction. Under the control of the control circuit 310, the main scanning unit 340 executes a main scan for reciprocating the print head 350 in the main scanning direction.

While not shown in the drawings, the print head 350 has a plurality of nozzle rows corresponding to the plurality of ink colors used in printing operations. In the embodiment, the print head 350 has four nozzle rows corresponding to the four ink colors cyan (C), magenta (M), yellow (Y), and black (K). Each nozzle row has a plurality (200, for example) of nozzles for ejecting ink droplets of the same color to form dots on the printing medium. A piezoelectric element (not shown) is provided for each nozzle in order to drive the nozzle to eject ink. By varying the applied voltage for driving the piezoelectric elements, it is possible to form dots of various sizes (diameters).

Each nozzle formed in the print head 350 according to the embodiment can form small dots, medium dots having a larger dot diameter than the small dots, and large dots having a larger dot diameter than the medium dots.

The control circuit 310 executes a printing operation by controlling the main scanning unit 340, the print head 350, and the sub scanning unit 360 according to print data supplied from the control unit 200.

A-2: Overview of a Printing Process

Figure 2:
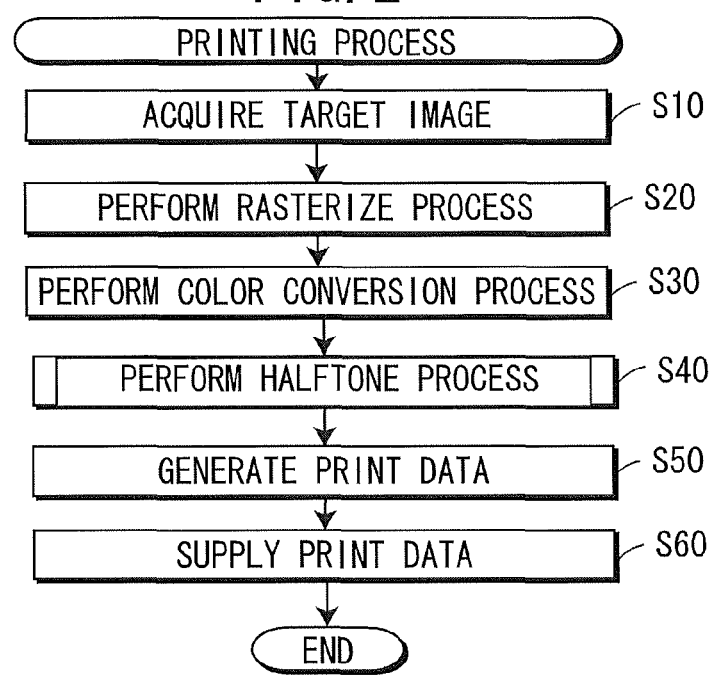
FIG. 2 is a flowchart illustrating steps in a printing process executed by the printer of FIG. 1.

FIG. 2 is a flowchart illustrating steps in a printing process executed by the printer 600 of FIG. 1. The print control unit 100 begins the printing process in response to a user command (for example, an operation executed by the user on the operating unit 260 or a print job received from a user's computer (not shown) connected to the communication unit 270).

In S10 of the printing process, the image data acquisition unit 110 acquires target image data. The image data acquisition unit 110 may extract this target image data from print jobs received from external computers, or from image data stored in the nonvolatile memory 230. The target image data is image data described in a page description language or image data compressed in the JPEG format, for example.

In S20 the image data acquisition unit 110 converts the target image data to RGB image data through a rasterization process. The pixel data constituting the RGB image data is data (RGB values) expressing pixel colors in gradation values (256 levels from 0 to 255, for example) for each of three color components red (R), green (G), and blue (B), for example.

In S30 the image data acquisition unit 110 converts the RGB image data to CMYK image data through a color conversion process. The pixel data constituting the CMYK image data is CMYK values expressing pixel colors in gradation values for the four color components corresponding to the ink colors CMYK. The color conversion process is performed using a lookup table with correlations between RGB values and CMYK values. The number of gradations for each component in the CMYK data is 1,024 levels from 0 to 1,023 in the embodiment, which is larger than the number of dot formation states (four in the embodiment: large dot, medium dot, small dot, and no dot). The number of gradations for the CMYK values is not limited to 1,024, but may be another number, such as 256 gradations from 0 to 255.

After completing the color conversion process, the image data acquisition unit 110 may also execute color correction processes, such as a calibration process and an ink quantity adjustment process. The calibration process is performed to correct the value of each of the CMYK color components so that the actual densities of colors printed on the printing medium change linearly in response to changes in the CMYK values. The ink quantity adjustment process is performed to correct each of the CMYK component values so that the quantity of ink required for printing does not exceed a reference quantity.

In S40 the error diffusion unit 120 converts the CMYK image data to dot data through a halftone process. The halftone process serves to convert each gradation value of the CMYK components constituting the CMYK image data to dot data representing the formation state of a dot for each pixel. The halftone process executed by the error diffusion unit 120 is an error diffusion process employing error matrices. The error diffusion process will be described later.

In S50 the print control unit 100 generates print data from the dot data. Print data is data in a format that the printing unit 300 can interpret. The print control unit 100 generates print data by rearranging the dot data in an order used for printing, and by adding various printer control codes, data identification codes, and the like.

In S60 the print data supply unit 130 provides the print data to the printing unit 300. The printing unit 300 prints an image based on the print data received from the print data supply unit 130.

A-3: Error Diffusion Process
A-3-1: Steps in the Process

Figure 3:
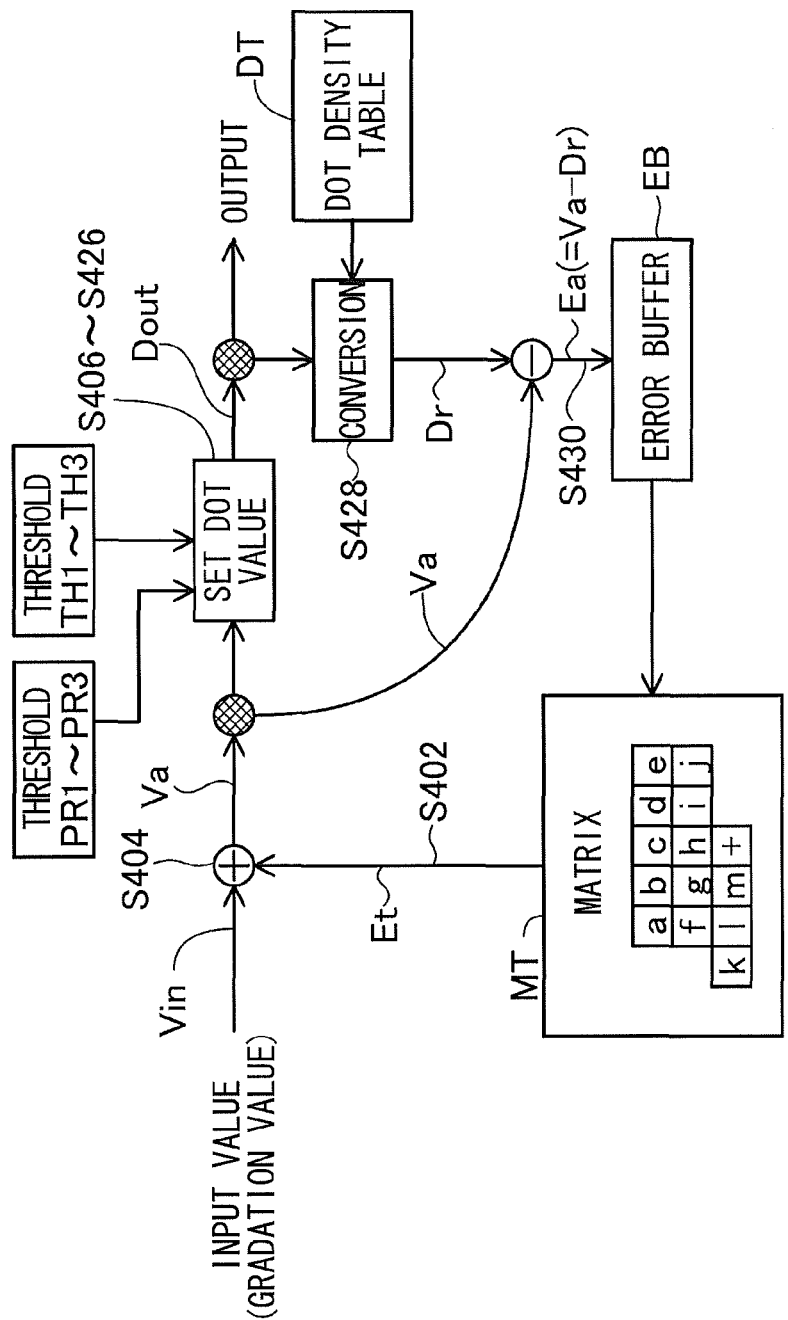
FIG. 3 is an overview of an error diffusion process.
Figure 4:
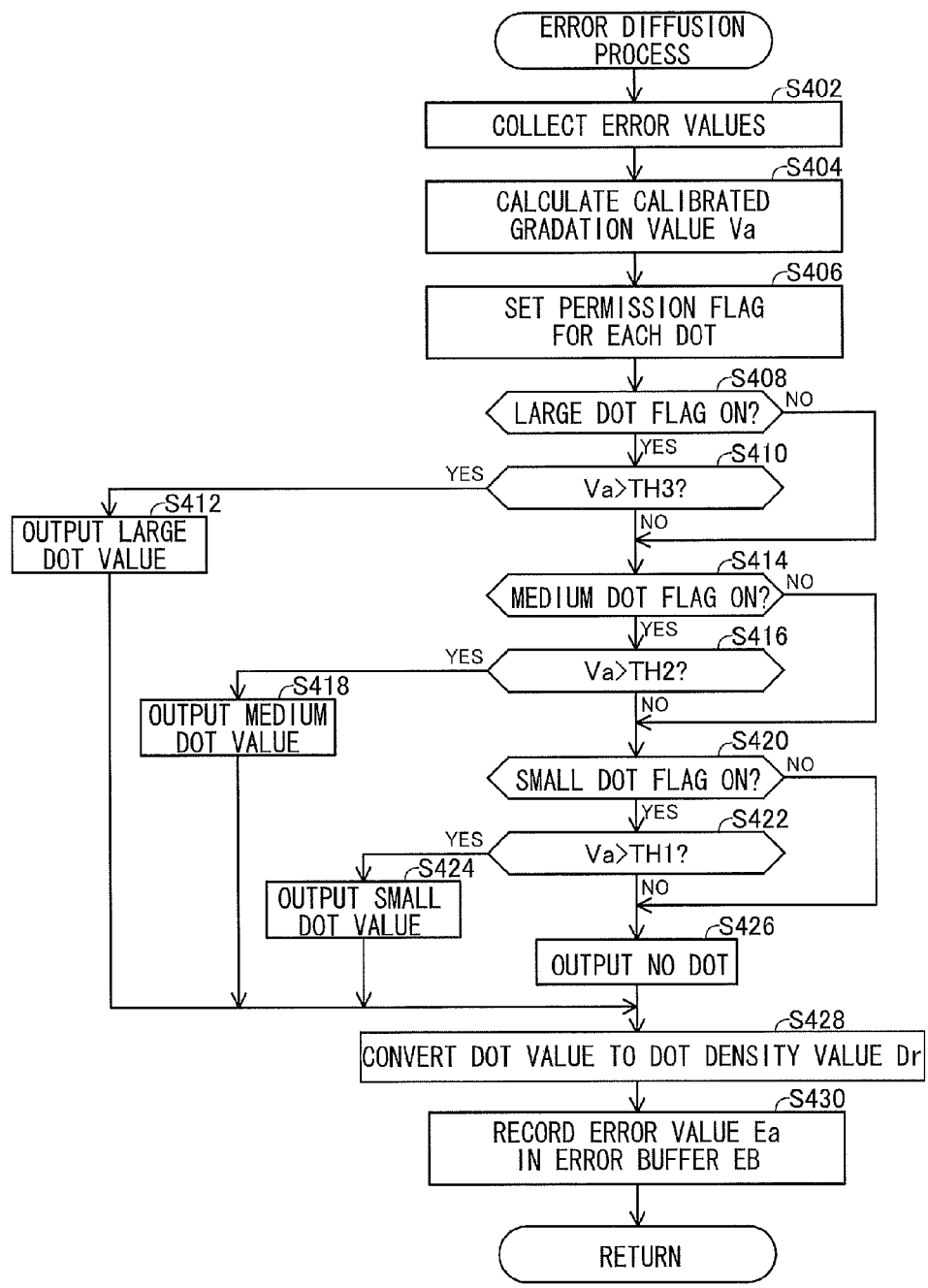
FIG. 4 is a flowchart illustrating steps in the error diffusion process.

The halftone process according to the embodiment is an error diffusion process. FIG. 3 is an overview of the error diffusion process, and FIG. 4 is a flowchart illustrating steps in the process. The error diffusion unit 120 executes this error diffusion process on each of the CMYK component values making up the CMYK image data. The error diffusion process for a single component (the cyan component, for example) is executed for each pixel. The CMYK image data represents an image having a plurality of pixels arranged in a matrix with a vertical dimension (columns) and a horizontal dimension (rows), for example. By executing the error diffusion process sequentially for each pixel in a row, the error diffusion unit 120 performs the process on a single row of pixels extending in the horizontal direction. After completing the process on one row of pixels, the error diffusion unit 120 executes the error diffusion process on the next row of pixels adjacent to the just-processed row in the vertical direction. Thus, the error diffusion unit 120 executes the error diffusion process on the plurality of pixel rows included in the CMYK image data by sequentially selecting each row of pixels in the vertical direction as the process target. Note that this order of processing pixels is merely an example, and the pixels may be processed in a different order.

In the error diffusion process, the error diffusion unit 120 assigns a dot value to each pixel being processed (hereinafter referred to as the target pixel). A dot value of "0" represents a dot-less value indicating that no dot is formed. A dot value of "1" represents a small dot value indicating that a small dot is formed. A dot value of "2" represents a medium dot value indicating that a medium dot is formed. A dot value of "3" represents a large dot value indicating that a large dot is formed.

In S402 at the beginning of the error diffusion process, the calibration unit 122 of the error diffusion unit 120 collects error values recorded in an error buffer EB and acquires a distributed error Et for the target pixel using an error matrix MT. The error buffer EB stores error values Ea for all pixels that have undergone the error diffusion process, i.e., processed pixels for which dot values have been set in the error diffusion process. The error values Ea are generated by performing the error diffusion process on the corresponding processed pixels. The error matrix MT defines distribution ratios that are assigned to each pixel in a prescribed relative position to the target pixel (a peripheral position to the target pixel). In the error matrix MT of FIG. 3, the "+" symbol represents the target pixel, and distribution ratios a-m have been assigned to peripheral pixels. The distribution ratios a-m total "1". Using the error matrix MT, the calibration unit 122 calculates the distributed error Et of the target pixel to be the sum of products obtained by multiplying the error value Ea of each peripheral pixel by the corresponding distribution ratio.

In S404 the calibration unit 122 calculates a calibrated gradation value Va by adding the distributed error Et and the gradation value of the target pixel (the input value Vin).

Figure 5:
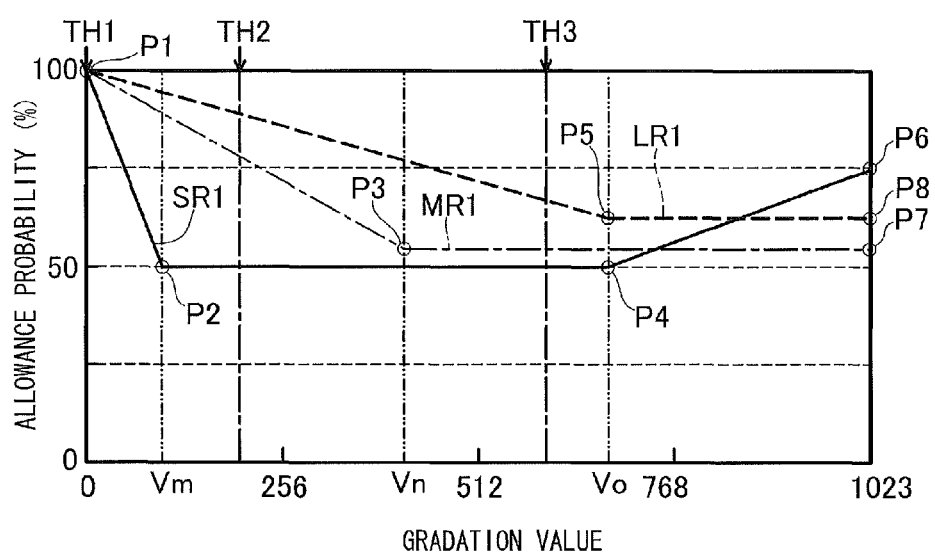
FIG. 5 is a graph showing a relationship between gradation values and allowance probabilities.

In S406 the determination unit 126 sets a permission flag for each dot according to allowance probabilities defined in the allowance probability data 234 (see FIG. 1). FIG. 5 is a graph showing the relationship between gradation values and allowance probabilities. As shown in FIG. 5, there are three allowance probabilities defined for each gradation value, including a large dot allowance probability LR1 set for large dots, a medium dot allowance probability MR1 set for medium dots, and a small dot allowance probability SR1 set for small dots. In the sample settings of FIG. 5, when the gradation value of the target pixel is 256, the large dot allowance probability LR1 is 86%, the medium dot allowance probability MR1 is 72%, and the small dot allowance probability SR1 is 50%. Hence, there is an 86% probability that the large dot permission flag will be set to ON and a 14% probability that the large dot permission flag will be set to OFF. More specifically, the determination unit 126 acquires a random number having a possible range of 0-99, for example, for determining the setting of the large dot permission flag. When the random number is within the range 0-85, the determination unit 126 sets the large dot permission flag to ON. When the random number is within the range 86-99, the determination unit 126 sets the large dot permission flag to OFF.

Similarly, there is a 72% probability that the determination unit 126 will set the medium dot permission flag to ON, and a 28% probability that the determination unit 126 will set the medium dot permission flag to OFF. Likewise, there is a 50% probability that the determination unit 126 will set the small dot permission flag to ON and a 50% probability that the determination unit 126 will set the small dot permission flag to OFF.

In S408 the determination unit 126 determines whether the large dot permission flag is set to ON. If the large dot permission flag is set to ON (S408: YES), in S410 the comparison unit 124 determines whether the calibrated gradation value Va is greater than a large dot threshold TH3. If the calibrated gradation value Va is greater than the large dot threshold TH3 (S410: YES), in S412 the setting unit 128 outputs the large dot value, i.e., sets the dot value for the target pixel to the large dot value. Thus, the condition described above for setting the dot value of the target pixel to the large dot value, i.e., the large dot forming condition for forming a large dot is that the large dot permission flag is ON and the calibrated gradation value Va is greater than the large dot threshold TH3.

However, if the large dot permission flag is OFF (S408: NO) or if the calibrated gradation value Va does not exceed the large dot threshold TH3 (S410: NO), the setting unit 128 does not set the dot value of the target pixel to the large dot value, and the process advances to S414. In other words, the dot value for the target pixel is not set to the large dot value when the large flag is set to OFF, even when the calibrated gradation value Va is greater than the large dot threshold TH3.

In S414 the determination unit 126 determines whether the medium dot permission flag is set to ON. If the medium dot permission flag is ON (S414: YES), in S416 the comparison unit 124 determines whether the calibrated gradation value Va is greater than a medium dot threshold TH2. If the calibrated gradation value Va is greater than the medium dot threshold TH2 (S414: YES), then in S418 the setting unit 128 outputs a medium dot value, i.e., sets the dot value for the target pixel to the medium dot value. Thus, the condition described above for setting the dot value of a target pixel to the medium dot value, i.e., the medium dot forming condition for forming a medium dot is that the large dot forming condition is not satisfied, the medium dot permission flag is ON, and the calibrated gradation value Va is greater than the medium dot threshold TH2.

However, if the medium dot permission flag is set to OFF (S414: NO) or if the calibrated gradation value Va does not exceed the medium dot threshold TH2 (S416: NO), then the setting unit 128 does not set the dot value of the target pixel to the medium dot value and the process advances to S420. In other words, the dot value of a target pixel is not set to the medium dot value when the medium dot permission flag is set to OFF, even when the calibrated gradation value Va is greater than the medium dot threshold TH2 and smaller than the large dot threshold TH3.

In S420 the determination unit 126 determines whether the small dot permission flag is set to ON. If the small dot permission flag is ON (S420: YES), in S422 the comparison unit 124 determines whether the calibrated gradation value Va is greater than a small dot threshold TH1. If the calibrated gradation value Va is greater than the small dot threshold TH1 (S422: YES), in 5424 the setting unit 128 outputs a small dot value, i.e., sets the dot value of the target pixel to the small dot value. Thus, the condition described above for setting the dot value of a target pixel to the small dot value, i.e., the small dot forming condition for forming a small dot is that the large dot forming condition is not satisfied, the medium dot forming condition is not satisfied, the small dot permission flag is set to ON, and the calibrated gradation value Va is greater than the small dot threshold TH1.

However, if the small dot permission flag is set to OFF (S420: NO) or if the calibrated gradation value Va is less than or equal to the small dot threshold TH1 (S422: NO), in S426 the setting unit 128 sets the dot value of the target pixel to a value indicating that a dot is not to be formed (no dot).

In the embodiment, the small dot threshold TH1, the medium dot threshold TH2, and the large dot threshold TH3 are set to 0, 200, and 600, respectively.

In S428 the setting unit 128 converts the dot value Dout (see FIG. 3) set in the above steps to the corresponding dot density value Dr. Four dot density values Dr are provided to correspond to the four possible dot values Dout. The dot density value Dr indicates the density represented by one of four types of dot formation states and is expressed as a gradation value corresponding to the respective CMYK value. In the embodiment, the dot density values Dr are set as follows.

A) Large dot: dot density value Dr=1,536
B) Medium dot: dot density value Dr=600
C) Small dot: dot density value Dr=200
D) No dot: dot density value Dr=0

The dot density values Dr are integrated in the programs 232 as a relative value table DT.

In S430 the error diffusion unit 120 calculates the error value Ea according to the following equation.

$$\text{Error value } Ea = \text{calibrated gradation value } Va - \text{dot density value } Dr$$

The error value Ea can be considered error produced between the dot density value Dr corresponding to the dot value set for the target pixel and the gradation value of the target pixel (the calibrated gradation value Va). The error diffusion unit 120 records the error value Ea in the error buffer EB. The error buffer EB stores error values Ea calculated in S430 for each processed pixel for which a dot value has been set in the error diffusion process. The distributed error Et acquired in S402 described above is the error distributed to the target pixel using the error matrix MT from among the error values Ea recorded in the error buffer EB, i.e., the error values Ea produced for the processed pixels.

Thus, the error diffusion process described above generates dot data for each color of ink. Here, the dot data includes a dot value for each pixel.

A-3-2: Allowance Probabilities of Dots

Next, the allowance probabilities of dots will be described in greater detail. As is clear from the error diffusion process described with reference to FIG. 4, a dot corresponding to a permission flag is not formed when the flag is OFF, regardless of whether other conditions have been met. In other words, a necessary condition for forming a specific type of dot is that the corresponding permission flag is ON. For example, when the allowance probability for a specific type of dot is 40% (that is, if there is a 40% probability that the permission flag for a specific type of dot will be ON for a specific gradation value), then formation of the specific type of dot will be allowed for 40% of all pixels of a uniform image configured of pixels having the specific gradation value, while formation of the specific type of dot will be prohibited for the remaining 60%.

As shown in the graph of FIG. 5, the small dot allowance probability SR1 is set to 100% for gradation value 0 (point P1) and is set to about 50% for a gradation value Vm (point P2). In this example, the gradation value Vm is about 100 and can be considered the gradation value positioned about halfway between the small dot threshold TH1 (gradation value 0) and the medium dot threshold TH2 (gradation value 200). In other words, the small dot allowance probability SR1 is set to decrease continuously and monotonically from 100% to approximately 50% for gradation values V within the range $0 \leq V \leq Vm$.

The small dot allowance probability SR1 is also set to a constant value (about 50%) for gradation values V within the range $Vm \leq V \leq Vo$ (points P2 and P4). Here, the gradation value Vo is about 680 and is equivalent to (maximum gradation value/large dot density)×maximum gradation value=(1,023/1,536)×1,023. Thus, the gradation value Vo is equivalent to the number of gradations in the saturation ratio to the total number of gradations. The saturation ratio is the ratio of large dots to the total number of pixels (maximum gradation value/large dot density) when the maximum gradation value is rendered using only large dots.

Further, the small dot allowance probability SR1 is set to about 75% for the maximum gradation value (1,023; point P6). The small dot allowance probability SR1 is set to values along the line segment connecting point P4 to point P6. In other words, the small dot allowance probability SR1 is set to increase continuously and monotonically from about 50% to about 75% for gradation values V within the range $Vo \leq V \leq 1,023$.

The medium dot allowance probability MR1 is set to 100% for gradation value 0 (point P1) and about 55% for a gradation value Vn (point P3). The gradation value Vn is about 420 and can be considered the gradation value at a position about 55% of the distance from the medium dot threshold TH2 (gradation value 200) to the large dot threshold TH3 (gradation value 600). The medium dot allowance probability MR1 is set to values on the line segment connecting point P1 to point P3. In other words, the medium dot allowance probability MR1 is set to decrease continuously and monotonically from 100% to approximately 55% for gradation values V in the range $0 \leq V \leq Vn$. The medium dot allowance probability MR1 is also set to a constant value (about 55%) for gradation values V within the range $Vn \leq V \leq 1,023$ (points P3 and P7).

The large dot allowance probability LR1 is set to 100% for gradation value 0 (point P1) and about 65% for gradation value Vo (point P5). The large dot allowance probability LR1 is set to values on the line segment connecting point P1 to point P5. In other words, the large dot allowance probability LR1 is set to decrease continuously and monotonically from 100% to about 65% for gradation values V within the range $0 \leq V \leq Vo$. The large dot allowance probability LR1 is also set to a constant value (about 65%) for gradation values V within the range $Vo \leq V \leq 1,023$ (points P5 and P8). Further, in the embodiment, for gradation values $0 \leq V \leq Vo$, the large dot allowance probability LR1 is larger than the medium dot allowance probability, and the medium dot allowance probability is larger than the small dot allowance probability.

According to the embodiment described above, the small dot forming condition for setting the dot value of a target pixel to the small dot value indicating the formation of a small dot includes satisfaction of a dot allowance condition based on the small dot allowance probability SR1 set according to the gradation value (specifically, whether the small dot permission flag is ON) in addition to the condition that the calibrated gradation value Va of the target pixel is greater than the small dot threshold TH1. This additional condition can prevent the small dot fanning condition from being satisfied. For example, the dot value of a target pixel will not be set to the small dot value if the small dot permission flag is OFF, even when the calibrated gradation value Va is greater than the small dot threshold TH1 and smaller than the medium dot threshold TH2. Thus, if the small dot forming condition is not satisfied, then the dot value is set to a value representing "no dot," increasing the possibility that the calibrated gradation value Va of the target pixel will be accumulated as error and thereby increasing the error value Ea that is produced based on the dot value set for the target pixel. Since the value of the calibrated gradation value Va is increased in subsequent error diffusion processes performed on separate pixels, this method increases the probability that the large dot forming condition or medium dot forming condition will be satisfied. Hence, by setting the small dot allowance probability SR1 based on gradation values, it is possible to encourage the formation of medium and large dots. In other words, this process suppresses the formation of small dots depending on the gradation values (particularly for a range of relative low gradation values) while encouraging the formation of large and medium dots depending on the gradation values. Properly controlling the formation rate of each dot depending on the gradation values in this way improves the quality of the printed image. These effects are not only obtained between small dots and medium and large dots, but also between medium dots and large dots. In other words, setting the medium dot allowance probability MR1 depending on gradation values encourages the formation of large dots.

Similarly, the large dot forming condition for setting the dot value of a target pixel to the large dot value indicating the formation of a large dot includes satisfaction of a dot allowance condition based on the large dot allowance probability LR1 set according to the gradation value (specifically, whether the large dot permission flag is ON) in addition to the condition that the calibrated gradation value Va of the target pixel is greater than the large dot threshold TH3. This additional condition can prevent the large dot forming condition from being satisfied. For example, the dot value of a target pixel will not be set to the large dot value if the large dot permission flag is OFF, even when the calibrated gradation value Va is greater than the large dot threshold TH3. Since this method increases the probability that the medium dot forming condition or small dot forming condition will be satisfied in a subsequent determination after the large dot forming condition was not satisfied, this method encourages the formation of medium and small dots. That is, this method suppresses the formation of large dots depending on gradation values (particularly for a range of relative high gradation values) while encouraging the formation of small and medium dots depending on the gradation values. Properly controlling the formation rate of each dot depending on the gradation values in this way improves the quality of the printed image. These effects are not only obtained between large dots and small and medium dots, but also between medium dots and small dots. In other words, setting the medium dot allowance probability MR1 depending on gradation values encourages the formation of small dots. This will be described next in greater detail with reference to FIG. 6.

Figure 6A:
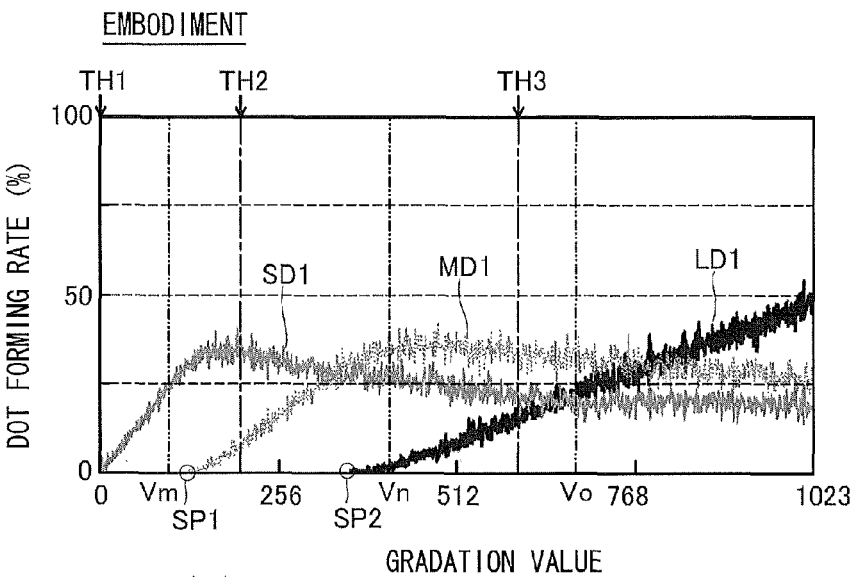
FIG. 6(A) is a graph showing a relationship between gradation values and dot-forming rates according to the embodiment.
Figure 6B:
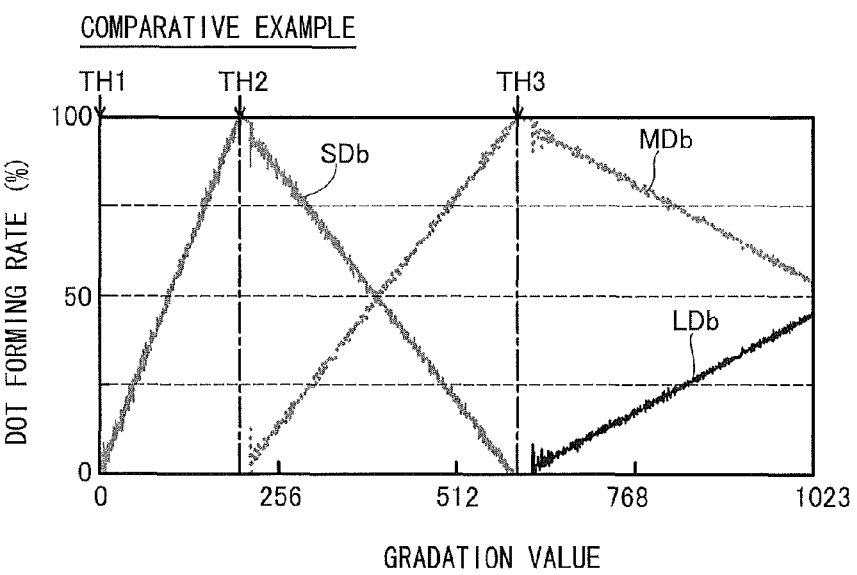
FIG. 6(B) is a graph showing a relationship between gradation values and dot-forming rates according to a comparative example.

FIGS. 6(A) and 6(B) show graphs of dot-forming rates according to the embodiment and a comparative example, and specifically the dot-forming rates for gradation values V within the range $0 \leq V \leq 1,023$. The dot-forming rates for each gradation value V indicate the proportions of large dot values, medium dot values, and small dot values occupying dot data obtained through the error diffusion process for a uniform image configured of pixels having the gradation value V. FIG. 6(A) shows the dot-forming rates in the embodiment, while FIG. 6(B) shows the dot-forming rates in a conventional comparative example. In the error diffusion process of the comparative example, dot formation is not restricted using allowance probabilities. In other words, allowance probabilities for the large, medium, and small dots are uniformly set to 100% across all gradation values in the error diffusion process of the comparative example.

First, the dot-forming rates in the error diffusion process according to the comparative example, i.e., a process in which dot formation is not restricted based on allowance probabilities, will be described with reference to FIG. 6(B). As shown in FIG. 6(B), only small dots are formed for gradation values V within the range TH1≤V≤TH2 (200), while no medium or large dots are formed. A small dot-forming rate SDb increases linearly as the gradation value increases within this range, reaching 100% at a gradation value equivalent to the medium dot threshold TH2, i.e., reaching a state in which small dots are formed for all pixels.

Next, for gradation values V within the range TH2≤V≤TH3 (600), both small and medium dots are formed, while large dots are not. Within this range, the small dot-forming rate SDb decreases linearly from 100% to 0% while a medium dot-forming rate MDb increases linearly from 0% to 100% as the gradation value increases. At the gradation value equivalent to the large dot threshold TH3, the medium dot-forming rate MDb reaches 100% while the small dot-forming rate SDb reaches 0%, at which point medium dots are formed for all pixels.

For gradation values V within the range TH3≤V≤maximum gradation value (1,023), both medium and large dots are formed, while small dots are not. Within this range, the medium dot-forming rate MDb decreases linearly from 100% to about 55% while a large dot-forming rate LDb increases linearly from 0% to about 45% as the gradation value V increases. At the maximum gradation value (1,023), the large dot-forming rate LDb has not reached 100% because the dot density value Dr for large dots is set to 1,536 as described above, i.e., a value greater than 1,023. The embodiment accounts for printing at a relatively high resolution, such as 1,200 dpi (vertically)×1,200 dpi (horizontally). Therefore, if the large dot-forming rate LDb were to reach 100%, the quantity of ink per unit area could exceed the reference (ink could run).

The comparative example described above tends to produce more regular dots in the printed image. For example, small dots are formed for all pixels when the gradation value V is equivalent to the medium dot threshold TH2, and medium dots are formed for all pixels when the gradation value V is equivalent to the large dot threshold TH3, increasing the regularity of dots in the printed image. Even at other gradation values, regularity in the printed image is not sufficiently low because of the relatively small number of dot types being formed (a maximum of two types). If there is any irregularity in the formed size or positions of dots due to cross-talk, control errors, or other factors, fluctuations in image quality (uneven density, banding, etc.) caused by such irregularities tend to be more pronounced when dot regularity in the printed image is relatively high. Cross-talk is a phenomenon in which behavior or change accompanying the ejection of ink from a single nozzle (pressure change in the ink channel, a shock wave produced when driving the piezoelectric element, etc.) influences the ejection of ink in other nozzles.

Next, dot-forming rates in the error diffusion process according to the embodiment will be described with reference to FIG. 6(A). As shown in FIG. 6(A), a small dot-forming rate SD1 increases linearly as the gradation value increases from 0 to about 150. The small dot-forming rate SD1 reaches its largest value at about gradation value 150, then decreases gradually as the gradation value increases from about 150 to the maximum gradation value of 1,023. The small dot-forming rate SD1 is maintained at about 20%, even at the maximum gradation value of 1,023.

A medium dot-forming rate MD1 is 0 between gradation values of 0 and about 150 and begins to increase from about gradation value 150, where the small dot-forming rate SD1 is at its maximum value (point SP1). The medium dot-forming rate MD1 increases linearly as the gradation value increases from about 150 to Vn (about 420), The medium dot-forming rate MD1 reaches its maximum value at about gradation value 420, then decreases gradually as the gradation value increases from about 420 to the maximum gradation value of 1,023. The medium dot-forming rate MD1 is maintained at about 25%, even at the maximum gradation value of 1,023.

A large dot-forming rate LD1 is 0 between gradation values 0 and about 300 and begins to increase from about gradation value 300 (point SP2). The large dot-forming rate LD1 increases linearly as the gradation value increases from about 300 to the maximum gradation value of 1,023.

As described above, the range of gradation values V for which only small dots are formed is limited to 0<V≤about 150, which is smaller than that in the comparative example. The embodiment also differs from the comparative example in the following ways. At no time in the embodiment is one type of dot formed for all pixels. Also in the embodiment, three types of dots (large, medium, and small) are formed within a relatively large range: about 300≤V≤1,023. Therefore, the embodiment produces less regularity of dots in the printed image than the comparative example. As a result, fluctuations in image quality caused by variations in the size or positions of formed dots are less pronounced in the printed images according to the embodiment than in the printed images according to the comparative example. Hence, the method of the embodiment improves the quality of the printed image.

Next, the method of forming dots in the embodiment will be described in greater detail. As described above, medium dots are even formed in a range of gradation values less than the medium dot threshold TH2 (200), and specifically a range near point SP1 shown in FIG. 6(A). This is because the small dot allowance probability SR1 is set to 50% for gradation values V within the range Vm≤V≤TH2 (see FIG. 2). As shown in the comparative example of FIG. 6(B), the dot-forming rate for small dots is 50% near gradation value Vm when allowance probabilities have not been set. Since the dot-forming rate for small dots levels off at 50% when the small dot allowance probability SR1 is set to 50% at the gradation value Vm, the formation of medium dots starts at a gradation value relatively near the gradation value Vm. In other words, if it is desirable to form medium dots near an arbitrary gradation value Vs that is less than or equal to the medium dot threshold TH2, an adjustment value Rs is calculated to satisfy the expression Vs>TH2×Rs and the small dot allowance probability SR1 is configured to reach the adjustment value Rs near the gradation value Vs. While it is not possible to begin forming medium dots precisely from the gradation value Vs with this method, it is possible to begin forming medium dots at a gradation value relatively near the gradation value Vs. As a result, a printed image having gradation values within a range up to the medium dot threshold TH2 can be funned using small and medium dots, thereby reducing the regularity of dot sizes in a printed image having gradation values less than or equal to the medium dot threshold TH2 to prevent fluctuations in image quality caused by variations in dot sizes and positions. While an increase in the average dot size can produce more noticeable graininess in a printed image, it can suppress banding. The method according to the embodiment can increase the average dot size in printed images having gradation values that do not exceed the medium dot threshold TH2 while at the same time suppressing banding, thereby improving the quality of the printed image.

Similarly, as shown in FIG. 6(A), large dots are even formed in a range of gradation values less than the large dot threshold TH3 (600), and specifically a range near point SP2. This is because the medium dot allowance probability MR1 is set to 55% for gradation values V within the range Vn≤V≤TH3 (see FIG. 5). Hence, the dot-forming rate for medium dots is 55% near gradation value Vn when allowance probabilities have not been set, as illustrated in FIG. 6(B). Since the dot-forming rate for medium dots levels off at 55% when the medium dot allowance probability MR1 is set to 55% at the gradation value Vn, the formation of large dots starts at a gradation value relatively near the gradation value Vn. In other words, if it is desirable to form large dots near an arbitrary gradation value Vt that is less than or equal to the large dot threshold TH3, an adjustment value Rt is calculated to satisfy the expression Vt>(TH3−TH2)×Rt and the medium dot allowance probability MR1 is configured to reach the adjustment value Rt near the gradation value Vt. While it is not possible to begin forming medium dots precisely from gradation value Vt with this method, it is possible to begin forming medium dots from a gradation value relatively near the gradation value Vt. As a result, a printed image having gradation values within a range that does not exceed the large dot threshold TH3 can be formed using large dots in addition to small and medium dots, thereby reducing the regularity of dot sizes in a printed image having gradation values less than or equal to the large dot threshold TH3 to prevent fluctuations in image quality caused by variations in dot sizes and positions. Further, the method according to the embodiment can increase the average dot size in printed images having gradation values that do not exceed the large dot threshold TH3 while at the same time suppressing banding, thereby improving the quality of the printed image.

Further, the small dot allowance probability SR1 is set to values smaller than the medium dot allowance probability MR1 within the range 0<V<TH2. This results in suppressing the formation of small dots within this range while encouraging the formation of medium dots.

In addition, the small dot allowance probability SR1 is set to decrease continuously within a range of gradation values smaller than the medium dot threshold TH2, and specifically in the range 0≤V≤Vm. This method suppresses abrupt changes in the dot-forming rate for small dots in response to changes in the gradation value within this range. This method can ensure accurate color tone reproducibility in the printed image.

In the embodiment described above, the print control unit 100 determines whether the medium dot allowance condition is satisfied (specifically, whether to set the medium dot permission flag to ON) based on the medium dot allowance probability MR1 set independently of the small dot allowance probability SRL. Further, the medium dot forming condition includes the condition that the medium dot permission flag is ON. Hence, the formation of medium dots depending on gradation values can be controlled independently from the formation of small dots. As a result, the dot-forming rates for small dots and medium dots can be more properly controlled based on the gradation values.

The medium dot allowance probability MR1 is configured to decrease continuously in the range of gradation values smaller than the large dot threshold TH3, and specifically within the range 0≤V≤Vn. Accordingly, this method can suppress abrupt changes in the dot-forming rate of medium dots in response to changes in gradation values, thereby ensuring accurate color tone reproducibility in the printed image.

As described above, only large and medium dots are formed for the range of gradation values exceeding the large dot threshold TH3 in the comparative example, but small dots are formed in this range in the embodiment in addition to the large and medium dots for two reasons. First, formation of large and medium dots is restricted by allowance probabilities. Specifically, the large dot allowance probability LR1 is set to about 65% in the range Vo≤V≤maximum gradation value (1,023). Further, the medium dot allowance probability MR1 is set to about 55% in the range TH3≤V≤maximum gradation value (1,023). Restricting the formation of large and medium dots within the range of gradation values exceeding the large dot threshold TH3 encourages the formation of small dots within the same range.

Another reason for forming small dots in this range is that the small dot allowance probability SR1 is set to increase continuously for the range of gradation values greater than the gradation value Vo. This relaxes the restriction on small dots within the range of gradation values greater than the large dot threshold TH3, encouraging formation of small dots within this range.

In the embodiment described above, the dot allowance probabilities SR1, MR1, and LR1 are all set to 100% for the minimum gradation value of 0. Hence, dot formation is not restricted by the dot allowance probabilities SR1, MR1, and LR1 at the minimum gradation value 0. Thus, in the range near the minimum gradation value 0 (the range from 0 to a reference value, such as 20), the dot allowance probabilities SR1, MR1, and LR1 are preferably set to 100% or a value near 100%. This can prevent the discouragement of dot formation within a range of relatively low densities (a range of gradation values relatively close to 0), ensuring the reproducibility of images within this range of gradation values.

The dot-forming rates for three types of dots are controlled in the embodiment by setting suitable dot allowance probabilities SR1, MR1, and LR1 for the three types of dots. Accordingly, it is possible to keep the process load for the error diffusion process to a comparatively low level. Another possible technique for controlling dot-forming rates of three types of dots is to divide the gradation value for each pixel in the target image data into three values and to assign each value to one of the three dot types. With this technique it is possible to perform the error diffusion process independently for the three types of dots using the three gradation values for each pixel. However, the method of the embodiment has less process load compared to this complex technique, thereby reducing computation time and required resources (CPU capacity, memory capacity, etc.).

B. Variations of the Embodiment

While the invention has been described in detail with reference to the embodiment thereof, it would be apparent to those skilled in the art that various changes and modifications may be made therein without departing from the scope of the invention.

(1) Next, a first variation of the embodiment will be described with reference to FIGS. 7(A) and 7(B). FIG. 7(A) shows the allowance probabilities according to the first variation, and FIG. 7(B) shows dot-forming rates SD2, MD2, and LD2 according to the first variation. In the first variation, the small dot allowance probability SR2 shown in FIG. 7(A) is employed in place of the small dot allowance probability SR1 according to the first embodiment. The small dot allowance probability SR2 of the first variation is identical to the small dot allowance probability SR1 of the first embodiment for gradation values in the range $0 \le V \le Vo$, but differs from the small dot allowance probability SR1 for gradation values in the range $Vo<V \le 1,023$ by remaining at a constant value (about 50%). The medium dot allowance probability MR1 and the large dot allowance probability LR1 are identical to those described in the first embodiment.

The configuration according to the first variation can also encourage the formation of medium dots for gradation values smaller than the medium dot threshold TH2, the formation of large dots for gradation values smaller than the large dot threshold TH3, and the formation of small dots for gradation values larger than the large dot threshold TH3. However, the configuration according to the first variation does not relax restrictions on small dot formation for gradation values in the range $Vo<V<1,023$. That is, the small dot allowance probability SR2 is maintained at about 50% in this range. Consequently, as illustrated in FIG. 7(B), the small dot-forming rate is lower for gradation values greater than the large dot threshold TH3 than in the embodiment (see FIG. 6(A)).

Figure 8A:
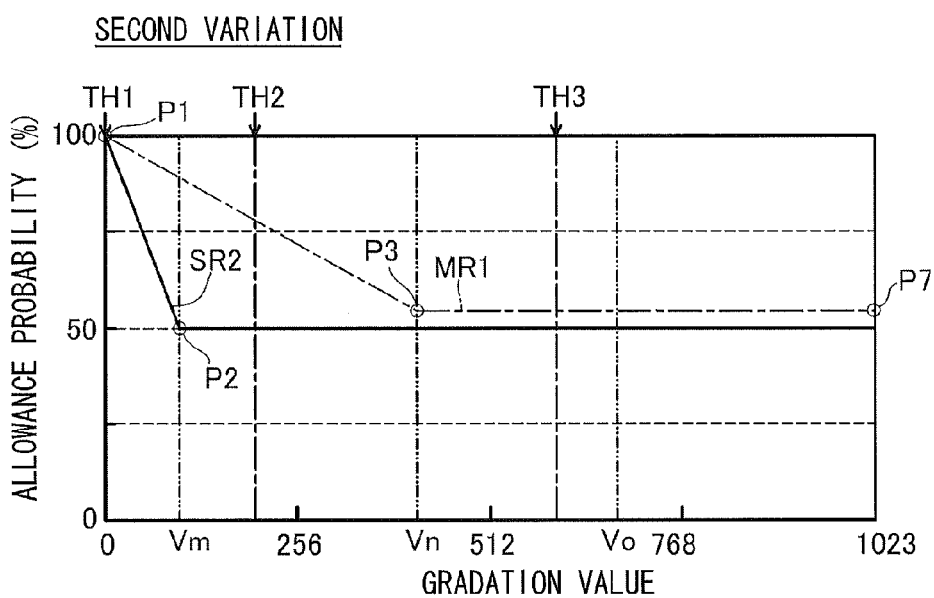
FIG. 8(A) is a graph showing a relationship between gradation values and allowance probabilities according to a second modification.
Figure 8B:
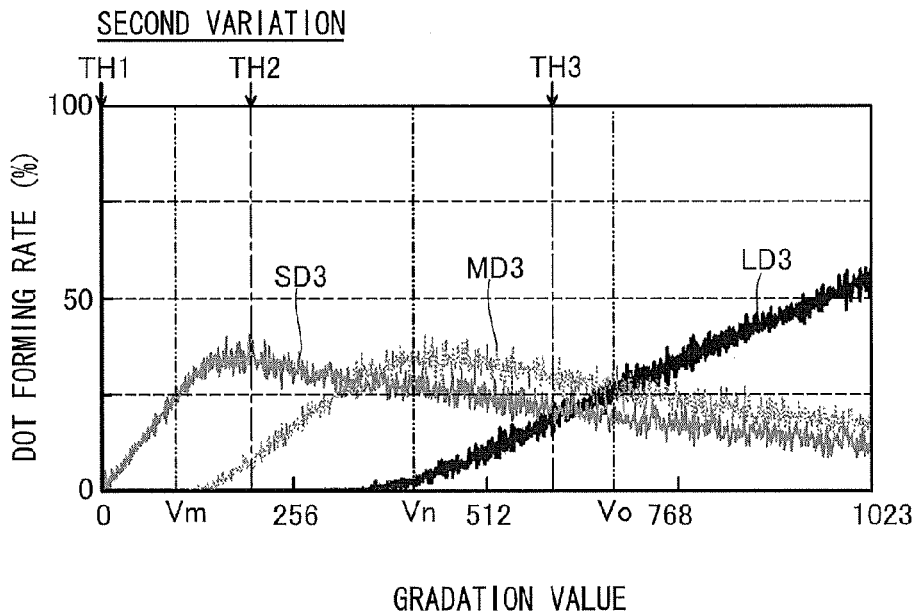
FIG. 8(B) is a graph showing a relationship between gradation values and dot-forming rates according to the second modification.

(2) Next, a second variation of the embodiment will be described with reference to FIGS. 8(A) and 8(B). FIG. 8(A) shows the allowance probabilities according to the second variation, while FIG. 8(B) shows dot-forming rates SD3, MD3, and LD3 according to the second variation. Note that the large dot allowance probability has not been set in the second variation. Therefore, a large dot permission flag is not used to determine whether or not to form a large dot and, hence, the large dot allowance probability is equivalent to 100%, regardless of the gradation value. The small dot allowance probability SR2 and medium dot allowance probability MR1 are identical in configuration to the first variation.

The configuration according to the second variation can also encourage the formation of medium dots for gradation values smaller than the medium dot threshold TH2, the formation of large dots for gradation values smaller than the large dot threshold TH3, and the formation of small dots for gradation values larger than the large dot threshold TH3. However, the formation of large dots is not restricted for gradation values greater than the large dot threshold TH3. Consequently, as is clear from FIG. 8(B), the large dot-forming rate is higher and the medium dot-forming rate lower for the range of gradation values greater than the large dot threshold TH3 than in the embodiment (see FIG. 6(A)) and the first variation (see FIG. 7(B)). Further, the small dot-forming rate is lower than that in the embodiment for gradation values greater than the large dot threshold TH3.

Thus, it is not necessary to set allowance probabilities for all types of dots. For example, it is possible to set only the small dot allowance probability SR1. Even by setting just the small dot allowance probability SR1, this configuration can suppress the formation of small dots while encouraging the formation of medium dots in the range of gradation values $Vm \le V \le TH2$, for example. It is also possible to set just the medium dot allowance probability MR1. Even when only the medium dot allowance probability MR1 is set, this configuration can suppress the formation of medium dots while encouraging the formation of large dots for gradation values within the range $Vn \le V \le TH3$, for example.

(3) Next, a third variation of the embodiment will be described with reference to FIG. 9. In the embodiment described above, the three dot allowance probabilities SR1, MR1, and LR1 are set to decrease continuously and monotonically as the gradation value increases within the range of gradation values from 0 to the prescribed gradation values Vm, Vn, and Vo, respectively. However, in the third variation, a medium dot allowance probability MR2 may be set to 100% for the range $0 \le V \le 120$ and may subsequently be configured to decrease continuously and monotonically as the gradation value increases within the range $120<V \le Vn$ (points P10 and P3). Similarly, in the third variation, a large dot allowance probability LR2 may be configured to be 100% within the range $0 \le V \le 380$ and to decrease continuously and monotonically along with an increase in gradation value within the range $380<V \le Vo$ (points P11 and P5). However, it is preferable to configure the dot allowance probabilities so that they do not change abruptly with changes in gradation values, such as being set to 100% for the gradation value 100 and being set to 50% for the gradation value 101. By avoiding such configurations, it is possible to prevent sudden changes in the printed image in response to changes in gradation values.

(4) While three types of dots are used in the embodiment described above, dots of two different sizes (e.g., small dots and large dots) may be used instead. In this case, an allowance probability is set for at least one of the small dot type and large dot type. For example, by restricting the formation of small dots using an allowance probability, it is possible to suppress the formation of small dots while encouraging the formation of large dots. Conversely, by restricting the formation of large dots with an allowance probability, it is possible to suppress the formation of large dots while encouraging the formation of small dots. In general, at least one type of dot from among a plurality of different dot sizes should be restricted with an allowance probability.

(5) In the embodiment described above, the determination unit 126 sets the three permission flags, after which the comparison unit 124 compares the calibrated gradation value Va to threshold values, and the setting unit 128 sets dot values based on the comparison results. However, the comparison unit 124 may first compare the calibrated gradation value Va to threshold values, and the determination unit 126 may set permission flags based on these results. For example, if the comparison unit 124 determines that a large dot should be formed, the determination unit 126 sets the large dot permission flag, and the setting unit 128 sets the dot value to the large dot value when the large dot permission flag is ON.

Further, it is not necessary to set all three permission flags; the permission flags may be set as needed. For example, the large dot permission flag is set first. Then, the comparison unit 124 may determine whether the calibrated gradation value Va is greater than the large dot threshold TH3 when the large dot permission flag is ON. If the large dot permission flag is OFF or if the calibrated gradation value Va is smaller than the large dot threshold TH3, then the determination unit 126 may set the medium dot permission flag. When the medium dot permission flag is ON, then the comparison unit 124 determines whether the calibrated gradation value Va is greater than the medium dot threshold TH2. If the medium dot permission flag is OFF or if the calibrated gradation value Va is less than the medium dot threshold TH2, then the determination unit 126 may set the small dot permission flag.

In addition, if the determination unit 126 sets the permission flag to OFF, the setting unit 128 may perform a setting indicating that a dot is not to be formed, without the comparison unit 124 comparing the calibrated gradation value Va to the thresholds TH1-TH3. Hence, the determination unit 126 determines whether a dot is to be formed in this case. Conversely, the comparison unit 124 may first compare the calibrated gradation value Va to the thresholds TH1-TH3. As an example, if the calibrated gradation value Va is smaller than the small dot threshold TH1, then the setting unit 128 may perform a setting indicating that a dot is not to be formed, without the determination unit 126 setting permission flags. Hence, the comparison unit 124 determines whether a dot is formed in this case.

(6) In the embodiment described above, the determination unit 126 sets the three permission flags for each pixel when determining the dot value for the pixel. However, the three permission flags may be set prior to setting the dot value for a target pixel. Specifically, the determination unit 126 may set permission flags for all of the pixels in the target image data. As an example, the determination unit 126 may set three permission flags for each pixel in the target image data based on the gradation values of the pixels, after which the error diffusion process may be executed as described in the embodiment.

(7) While the functions of the print control unit 100 are implemented by the control unit 200 in the printer 600 according to the embodiment described above, these functions may be implemented by a computing device, such as a personal computer, connected to the printer 600. In this case, the functions of the print control unit 100 may be implemented as the functions of a printer driver running on the personal computer, for example. Alternatively, the functions of the print control unit 100 may be divided among a plurality of computers that can communicate over a network (cloud servers, for example). In this case, the computers that share these functions together correspond to the print controller of the present invention.

(8) Part of the processes implemented in hardware in the embodiment may be replaced with software processes, while conversely part of the processes implemented in software may be replaced with a hardware configuration.

When all or part of the functions of the present invention are implemented in software (i.e., computer programs), this software can be supplied on a computer-readable storage medium. The "computer-readable storage medium" may be a portable medium, such as a memory card or CD-ROM; an internal storage device built into the computer, such as any of various RAM, ROM, or the like; or an external storage device, such as a hard disk drive connected to the computer.

What is claimed is:

1. A print control device comprising:
   a processor; and
   a memory that stores a computer program that, when executed by the processor, causes the control device to function as:
   an acquiring unit configured to acquire image data representing an image including a plurality of pixels, the image data including a plurality of pixel data corresponding to the plurality of pixels, each of the plurality of pixel data including a gradation value;
   an executing unit configured to execute an error diffusion process on each of the plurality of pixel data, the executing unit including:
      a target pixel setting unit configured to set target pixel data from among the plurality of pixel data;
      a correcting unit configured to correct a gradation value of the target pixel data by using a distribution error, the distribution error being set by at least one error value of at least one pixel data on which the error diffusion process has been executed;
      a first determining unit configured to determine whether a corrected value of the target pixel data is larger than a first threshold value, and determine whether the corrected value of the target pixel data is larger than a second threshold value different from the first threshold value;
      a second determining unit configured to determine whether a first allowance condition is satisfied, the first allowance condition being determined by a first probability, the first probability depending on the gradation value of the target pixel data;
   a dot value setting unit configured to set a dot value of the target pixel data to one of a first dot value and a second dot value different from the first dot value, the dot value indicating a size of a dot; and
      an error value setting unit configured to set an error value of the target pixel data based on both concentration value corresponding to the dot value of the target pixel data and the corrected value of the target pixel data; and
   an output unit configured to output print data determined by the dot value for each of the plurality of pixel data,
   wherein the executing unit executes one of a first setting process and a second setting process,
   wherein in the first setting process, the executing unit determines whether a first condition is satisfied, the first condition including that the corrected value of the target pixel data is larger than the first threshold value and that the first allowance condition is satisfied,
   wherein in the first setting process, after the executing unit determines that the first condition is satisfied, the dot value setting unit sets the dot value of the target pixel data to the first dot value,
   wherein in the first setting process, after the executing unit determines that the first condition is not satisfied, the executing unit determines whether a second condition is satisfied, the second condition including that the corrected value of the target pixel data is larger than the second threshold value,
   wherein in the second setting process, the executing unit determines whether the second condition is satisfied,
   wherein in the second setting process, after the executing unit determines that the second condition is satisfied, the dot value setting unit sets the dot value of the target pixel data to the second dot value,
   wherein in the second setting process, after the executing unit determines that the second condition is not satisfied, the executing unit determines whether the first condition is satisfied.

2. The print control device according to claim 1, wherein the second dot value indicates a size of the dot larger than a size of the dot indicated by the first dot value, and the second threshold value is larger than the first threshold value,
   wherein the executing unit executes the first setting process,
   wherein the dot value setting unit does not set the dot value of the target pixel data to the first dot value when the first allowance condition is not satisfied, even when the corrected value of the target pixel data is larger than the first threshold value and smaller than the second threshold value.

3. The print control device according to claim 2, wherein the second determining unit further determines whether a second allowance condition is satisfied, the second allowance condition being determined by a second probability,
   wherein when the second condition further includes that the second allowance condition is satisfied, the dot value setting unit sets the dot value of the target pixel data to the second dot value.

4. The print control device according to claim 3, wherein the first probability is smaller than the second probability when the gradation value is in a prescribed first range including a value smaller than the second threshold value.

5. The print control device according to claim 1, wherein the first probability decreases continuously when the gradation value is in a prescribed second range including a value smaller than the second threshold value.

6. The print control device according to claim 3, wherein the first determining unit further determines whether the corrected value of the target pixel data is larger than a third threshold value larger than the second threshold value, wherein when the corrected value of the target pixel data is larger than the third threshold value, the dot value setting unit sets the dot value of the target pixel data to a third dot value from among the plurality of dot values, the third dot value indicating a size of the dot larger than the size of the dot indicated by the second dot value, wherein the second probability decreases continuously when the gradation value is in a prescribed third range including a value smaller than the third threshold value.

7. The print control device according to claim 6, wherein the first probability increases continuously when the gradation value is in a fourth range including a value larger than the third threshold value.

8. The print control device according to claim 1, wherein the second dot value indicating a size of the dot smaller than a size of the dot indicated by the first dot value, and the second threshold value is smaller than the first threshold value.

9. The print control device according to claim 1, wherein the dot value setting unit sets the dot value of the target pixel based on a determination result of the first determining unit and a determination result of the second determining unit.

10. A non-transitory computer-readable storage medium storing computer-readable instructions that, when executed by a processor, causes an image processing device to perform:

acquiring image data representing an image including a plurality of pixels, the image data including a plurality of pixel data corresponding to the plurality of pixels, each of the plurality of pixel data including a gradation value;

executing an error diffusion process on each of the plurality of pixel data, the executing including:

setting target pixel data from among the plurality of pixel data;

correcting a gradation value of the target pixel data by using a distribution error, the distribution error being set by at least one error value of at least one pixel data on which the error diffusion process has been executed;

determining whether a corrected value of the target pixel data is larger than a first threshold value;

determining whether the corrected value of the target pixel data is larger than a second threshold value different from the first threshold value;

determining whether a first allowance condition is satisfied, the first allowance condition being determined by a first probability, the first probability depending on the gradation value of the target pixel data;

setting a dot value of the target pixel data to one of a first dot value and a second dot value different from the first dot value, the dot value indicating a size of a dot; and setting an error value of the target pixel data based on both concentration value corresponding to the dot value of the target pixel data and the corrected value of the target pixel data; and outputting print data determined by the dot value for each of the plurality of pixel data, wherein the executing executes one of a first setting process and a second setting process, wherein in the first setting process, the executing determines whether a first condition is satisfied, the first condition including that the corrected value of the target pixel data is larger than the first threshold value and that the first allowance condition is satisfied, wherein in the first setting process, after the executing determines that the first condition is satisfied, the setting of the dot value sets the dot value of the target pixel data to the first dot value, wherein in the first setting process, after the executing determines that the first condition is not satisfied, the executing determines whether a second condition is satisfied, the second condition including that the corrected value of the target pixel data is larger than the second threshold value, wherein in the second setting process, the executing determines whether the second condition is satisfied, wherein in the second setting process, after the executing determines that the second condition is satisfied, the setting of the dot value sets the dot value of the target pixel data to the second dot value, wherein in the second setting process, after the executing determines that the second condition is not satisfied, the executing determines whether the first condition is satisfied.

* * * * *